(12) United States Patent
McKinley et al.

(10) Patent No.: US 8,006,844 B2
(45) Date of Patent: Aug. 30, 2011

(54) PACKAGING SYSTEM FOR PRODUCING A FOAM-IN-BAG AND METHOD OF MIXING FOAM

(75) Inventors: Kerry McKinley, Newton, CT (US); Thomas V. Trauscht, Arlington Heights, IL (US)

(73) Assignee: Ivex Protective Packaging, Inc., Bridgeview, IL (US)

( * ) Notice: Subject to any disclaimer, the term of this patent is extended or adjusted under 35 U.S.C. 154(b) by 534 days.

(21) Appl. No.: 11/859,299

(22) Filed: Sep. 21, 2007

(65) Prior Publication Data

US 2009/0078595 A1 Mar. 26, 2009

(51) Int. Cl.
*B65D 81/05* (2006.01)
*B65D 81/32* (2006.01)
(52) U.S. Cl. ........................................ 206/524; 206/219
(58) Field of Classification Search .......... 206/219–222, 206/521, 523, 524, 568, 484; 383/38
See application file for complete search history.

(56) References Cited

U.S. PATENT DOCUMENTS

| | | | |
|---|---|---|---|
| 2,234,065 A | 3/1941 | Vogt | |
| 2,907,173 A * | 10/1959 | Robbins | 62/4 |
| 3,156,352 A | 11/1964 | Hayhurst | |
| 3,175,558 A | 3/1965 | Caillouette et al. | |
| 3,211,431 A | 10/1965 | Meysembourg et al. | |
| 3,222,843 A | 12/1965 | Schneider | |
| 3,294,224 A | 12/1966 | Horwitz | |
| 3,332,670 A | 7/1967 | Swartz | |
| 3,338,403 A | 8/1967 | Carlson | |
| 3,338,407 A | 8/1967 | Carlson | |
| 3,343,664 A | 9/1967 | Poitras | |
| 3,419,134 A | 12/1968 | Fitts | |
| 3,464,541 A | 9/1969 | Papendick et al. | |
| 3,674,134 A | 7/1972 | Turner | |
| 3,722,833 A | 3/1973 | Inoue et al. | |

(Continued)

FOREIGN PATENT DOCUMENTS

BE 894724 10/2007

(Continued)

OTHER PUBLICATIONS

International Searching Authority, Search Report for PCT/US2008/076187, Jan. 16, 2009, United States.

*Primary Examiner* — Steven A. Reynolds
(74) *Attorney, Agent, or Firm* — Vedder Price P.C.

(57) ABSTRACT

The present disclosure relates to a packaging system for producing a foam-in bag and method of mixing foam for the packaging of articles for shipment and storage, and in particular, to an improved, flexible, multilayered packaging system with a vented, deformable outer bag and an inner confinement structure made of paperboard box or a plastic bag with reclosable opening for optimal mixing and controlled release of the foam using preferential paths, score lines, weakness points, and/or obstacles to flow. In addition, the precursor fluids are placed in individually sealed pouches with calibrated and aptly positioned frangible seals to facilitate mixing after rupture inside of the inner confinement structure. In another embodiment, one of the precursor fluids is placed directly in the inner confinement structure, and in yet another embodiment, both sealed pouches are adhesively joined to the inner confinement structure. What is also disclosed is a method of mixing foam precursors in the different embodiments of the foam-in-bag packaging system.

7 Claims, 12 Drawing Sheets

U.S. PATENT DOCUMENTS

| | | | |
|---|---|---|---|
| 4,056,913 A | | 11/1977 | Bamburg et al. |
| 4,057,047 A | * | 11/1977 | Gossett .................... 126/263.07 |
| 4,145,449 A | | 3/1979 | Nelham |
| 4,226,330 A | | 10/1980 | Butler |
| 4,232,788 A | | 11/1980 | Roth |
| 4,511,533 A | * | 4/1985 | Guadagno et al. ............... 422/61 |
| 4,637,061 A | | 1/1987 | Riese |
| 4,660,353 A | | 4/1987 | Greenwell |
| 4,735,675 A | | 4/1988 | Metz |
| 4,800,708 A | | 1/1989 | Sperry |
| 4,854,109 A | | 8/1989 | Pinarer et al. |
| 4,889,234 A | | 12/1989 | Sorenson et al. |
| 4,938,007 A | | 7/1990 | Sperry |
| 5,027,583 A | | 7/1991 | Chelak |
| 5,139,151 A | | 8/1992 | Chelak |
| 5,287,961 A | | 2/1994 | Herran |
| 5,376,219 A | | 12/1994 | Sperry et al. |
| 5,699,902 A | | 12/1997 | Sperry et al. |
| 5,873,221 A | | 2/1999 | Sperry et al. |
| 5,899,325 A | | 5/1999 | Bertram et al. |
| 5,913,603 A | | 6/1999 | Sperry et al. |
| 5,967,308 A | | 10/1999 | Bowen |
| 5,986,239 A | | 11/1999 | Corrigan, III et al. |
| 5,996,782 A | | 12/1999 | Sperry et al. |
| 6,003,288 A | | 12/1999 | Sperry et al. |
| 6,036,004 A | | 3/2000 | Bowen |
| 6,062,381 A | * | 5/2000 | Paley et al. .................... 206/233 |
| 6,065,636 A | | 5/2000 | Sperry et al. |
| 6,149,655 A | | 11/2000 | Constantz et al. |
| 6,245,176 B1 | | 6/2001 | Greenland |
| 6,272,813 B1 | | 8/2001 | Sperry et al. |
| 6,386,850 B1 | | 5/2002 | Salerno et al. |
| 6,629,599 B2 | | 10/2003 | Sperry et al. |
| 6,712,201 B1 | | 3/2004 | Bertram et al. |
| 6,767,131 B2 | | 7/2004 | Taheri |
| 6,862,868 B2 | | 3/2005 | Sperry et al. |
| 6,929,127 B1 | | 8/2005 | Delk, Sr. |
| 6,953,277 B2 | | 10/2005 | Karslake et al. |
| 6,974,025 B2 | | 12/2005 | Bertram et al. |
| 6,983,839 B2 | | 1/2006 | Bertram et al. |
| 6,997,319 B2 | | 2/2006 | Mahon et al. |
| 7,077,636 B2 | | 7/2006 | Anders et al. |
| 2004/0262175 A1 | | 12/2004 | Moscovitz |
| 2005/0004423 A1 | | 1/2005 | Shenosky et al. |
| 2005/0033207 A1 | | 2/2005 | Anders |
| 2005/0115845 A1 | | 6/2005 | Cho |
| 2006/0070909 A1 | | 4/2006 | Mahon et al. |
| 2006/0272289 A1 | | 12/2006 | Pausa et al. |

FOREIGN PATENT DOCUMENTS

| | | |
|---|---|---|
| FR | PCTFR9900526 | 9/1999 |
| GB | 2134067 | 8/1984 |
| US | PCTUS9705434 | 10/1997 |
| US | PCTUS9807448 | 10/1998 |
| US | PCTUS9807740 | 10/1998 |

* cited by examiner

PACKAGING SYSTEM FOR PRODUCING A FOAM-IN-BAG AND METHOD OF MIXING FOAM

FIELD OF THE DISCLOSURE

The present disclosure relates to a packaging system for producing a foam-in bag and method of mixing foam for the packaging of articles for shipment and storage, and in particular, to an improved, flexible, multilayered packaging system with an intermediate level of confinement, peelable seals, folds, release paths, or score lines, and a method of mixing precursor packets within a confined volume.

BACKGROUND

With the growth of online purchasing, shipment of articles of trade having complex geometries is increasing. One of the known methods often used by large retail chains is packing equipment using specially designed Styrofoam inserts, but these inserts are unavailable to stores with limited series of fragile items or with items customized for each end user. Other packaging methods include the use of air cushions, cardboard inserts, or Styrofoam chips. All these methods require storage of bulky packing materials in an area dedicated to packaging within a shipment room. These methods also suffer from human error; for example, Styrofoam chips may be omitted on one side of an object or may migrate within a box during transportation due to low-frequency vibration.

Foam-in-bag packaging techniques offer a possible solution to this storage problem. Two liquids, called precursors, are mixed in controlled quantities when foam is needed in low volume. The liquids react chemically to form a polymer-based foam and gas byproducts. One of the most commonly used pairs of precursors is the isocyanate-based precursor and the polyol-based precursor. These two compounds react to form a urethane polymer called polyurethane. Byproducts of this reaction include steam (water and heat), fluorocarbons, and carbon dioxide. The formation of byproducts is both necessary and unavoidable and must be controlled to obtain the desired foam density and strength since the polyurethane foam is a three-dimensional matrix of gas bubbles held in place by polyurethane.

In the best of conditions, the precursors are mixed instantly and expand fully within an infinite volume. After about ten seconds of mixing, foaming begins, the mixture expands for about fifteen to twenty seconds, and it hardens after about one minute. In less than optimal conditions, the precursors are partly mixed, are partly constrained by storage packaging, and are warped into shape around objects.

In a first generation of foam-in packaging devices, the foam precursors are injected directly into containers, such as corrugated boxes or molds. Because these containers are not airtight, leaks are frequently observed and gaseous byproducts can evacuate the volume freely. In later generations, precursors were injected in plastic bags that allow for shape-change during expansion. The bags could be placed in boxes, and as the foam expanded, the bag would fill in. If timing is managed properly, the item to be packaged, if not too heavy, could rest on the viscous, unsolidified foam. Such bags must include vents for releasing excess gaseous byproducts into the surrounding space. These technologies require the management and manipulation by an operator of the two liquid precursors, along with the plastic bags. If operators place too much liquid in the bag or do not mix the precursors in the correct proportions, the resulting foam can be less than optimal.

In new foam-in-bag inventions, the precursors are placed within sealed pouches and can be mixed when adjacent pouches are ruptured with an external force, such as hand pressure or foot pressure. To create a homogeneous foam within a volume to be packaged, the foam must be allowed to expand continuously during the expansion period and not be subject to pressure waves in the container, where expanding foam must defeat confinement barriers. For example, a first prior art reference discloses how inner pouches can be placed within an outer pouch, which is in turn placed inside the shipping container to be filled with foam. Under this early configuration, the liquid from the bags did not mix absent manipulation by the user. The outer pouch, once filled with partly expanded foam, increases in size and pressure until it bursts, often following an uncontrolled path. A second prior art reference discloses the use of two precursor packets joined and sealed within the pouches by frangible seals. Since no preferred path of release is contemplated, external frangible seals break before the frangible seal located between both precursor zones breaks. Finally, a last prior art reference teaches how an external bag can be formed with fixed internal pockets having frangible seals to draw the precursor liquids into a mixing zone. This technology requires the engineering, use, and testing of multicompartment bags with complex technology requiring manipulation of the precursor fluids during manufacture.

What is needed is a foam-in-bag packaging system that enhances the mixing of the precursor liquids, controls the flow of the foam during expansion and hardening, prevents the formation of pressure walls that overly compress the foam, and can be implemented in containers of simple geometry.

SUMMARY

The present disclosure relates to a packaging system for producing a foam-in bag and method of mixing foam for the packaging of articles for shipment and storage, and in particular, to an improved, flexible, multilayered packaging system with a vented, deformable outer bag and an inner confinement structure made of paperboard box or a plastic bag with a reclosable opening for optimal mixing and release of the foam using preferential paths, score lines, weakness points, and/or obstacles to flow and expansion. In addition, the precursor fluids are placed in individually sealed pouches with calibrated and aptly positioned frangible seals to facilitate mixture after rupturing the pouches within the inner confinement structure. In another embodiment, one of the precursor fluids is placed directly in the inner confinement structure. In yet another embodiment, both sealed pouches are adhesively joined to the inner confinement structure. What is also disclosed is a method of mixing foam precursors in the above-disclosed embodiments of the foam-in-bag packaging system.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION OF THE INVENTION

The present invention is not limited to the particular details of the device depicted and other modifications and applications may be contemplated. Further changes may be made in the above-described device without departing from the true spirit of the scope of the disclosure herein involved. It is intended, therefore, that the subject matter of the above depictions should be interpreted as illustrative, not in a limiting sense.

FIGS. 1-2, 29, and 31 illustrate four perspective views of the packaging system 1 for producing a foam-in bag having a plastic bag with a reclosable opening according to four of the numerous different contemplated embodiments. For each embodiment, a closed, deformable outer bag 200 holds an inner container, such as a plastic bag with a reclosable opening 100, a paperboard box 60, or other container. In one embodiment, the deformable outer bag 200 is made of a single-thickness, transparent plastic bag, which includes a gas release valve 127 or vent on the outer surface of the deformable bag 200 to release any gas formed or present inside the deformable bag 200 to the outside of the deformable bag 200. Gas located inside the deformable outer bag 200 is released to facilitate folding and storage of an airtight bag 200 of the packaging system 1 or to prevent the accumulation of gaseous byproduct resulting from the chemical reaction from mixing a first precursor solution 25 with a second precursor solution 35 during the formation of foam inside the bag 200.

While a single valve 127 is shown, what is contemplated is the use of any gas release system, such as a lip, a reclosable opening, a tube, a calibrated spring valve, pinholes or any combination thereof capable of controlling the flow of gas from inside of the deformable outer bag 200 to the exterior of the deformable outer bag 200. A valve is used essentially to retain the foam produced inside the deformable bag 200 while the gas produced as a byproduct, if produced in excess of the needed quantity, is released. The valve 127 can be calibrated at a fixed release pressure to accumulate an initial volume of gaseous byproduct to serve to expand the deformable outer bag 200 in position before the foam is fully expanded.

Figure 10:
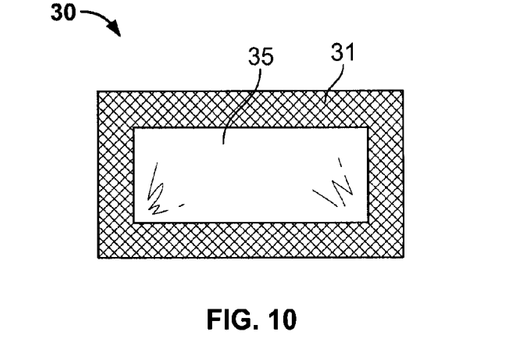
FIG. 10 is a top view of a precursor packet with a top, a bottom, and two lateral peelable seals according to another embodiment of the precursor packet of the present disclosure.

Within the scope of this disclosure, the area shown with a hashed surface with lines along one direction corresponds to a permanent seal 2 created between two juxtaposed layers of material in a bag 200, 100, as sealed by known sealing technologies as a result of folding of a layer of plastic. Alternatively, what is shown as an area with a hashed surface with angled hash lines along two perpendicular orientation (cross-hashed), such as is shown on the periphery of the precursor packet 30 of FIG. 10, is a peelable seal or a type of frangible seal. Peelable seals, in one embodiment, correspond to the union of two adjacent layers of material, partially bonded or secured to each other using a myriad of technologies, capable of releasing from each other once a sheer force is present, such as a pull or internal pressure in a closed volume.

Figure 1:
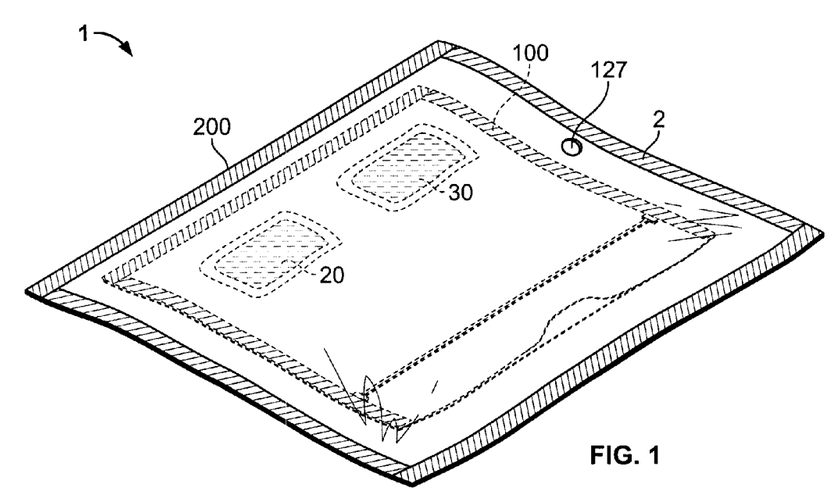
FIG. 1 is a perspective view of the packaging system for producing a foam-in bag with a plastic bag having a reclosable opening according to a first embodiment of the present disclosure.
Figure 3:
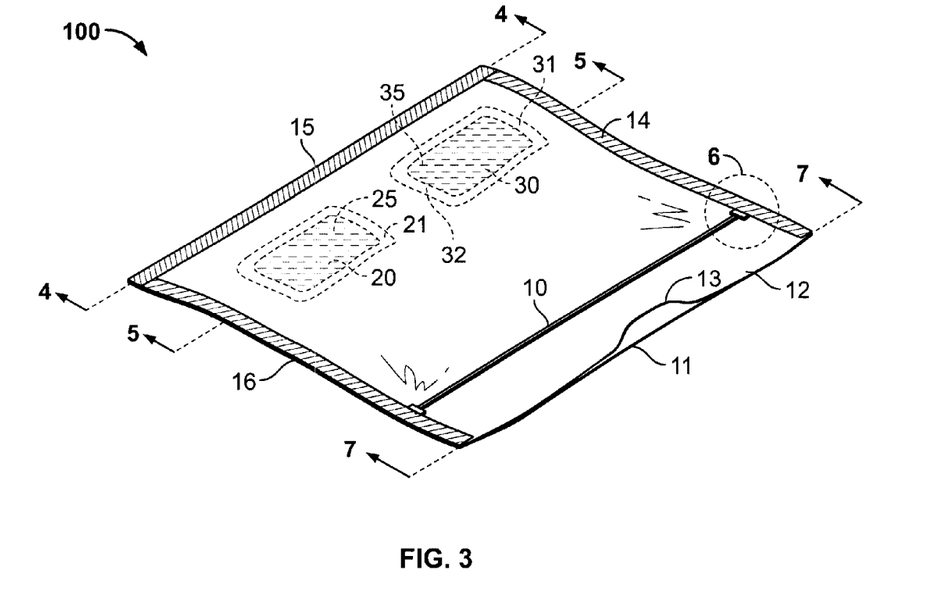
FIG. 3 is a perspective view of the plastic bag having a reclosable opening as shown in FIG. 1 according to an embodiment of the present disclosure.

In one embodiment shown in FIG. 1, a plastic bag with a reclosable opening 100 is confined within the deformable outer bag 200. Details of the different elements of the plastic bag with a reclosable opening 100 are shown in FIG. 3. The deformable outer bag 200 and the plastic bag with a reclosable opening 100 have been illustrated with internal elements shown by dashed lines in an effort to illustrate their internal position. While in a preferred embodiment, the use of transparent or partly transparent bags 100, 200 is contemplated as the preferred embodiment to provide visual guidance to a user where pressure is to be applied to the internal elements of the packaging system 1, what is contemplated is the use of any bag, made of any deformable material, having any geometry, shape, surface finish, transparency, or color, such as but not limited to deformable polymers including plastic or vinyl. By way of nonlimiting example, markings could be made on the external surface of the deformable outer bag 200 such as "push here" to guide a user using a nontransparent bag. In another nonlimiting example, the deformable outer bag 200 and plastic bag with a reclosable opening 100 could be folded in such a way that the entire surface of the packaging system 1 must be pressed to release the precursor materials from the precursor packets 20, 30 in an effort to provide users with operating guidance.

Figure 31:
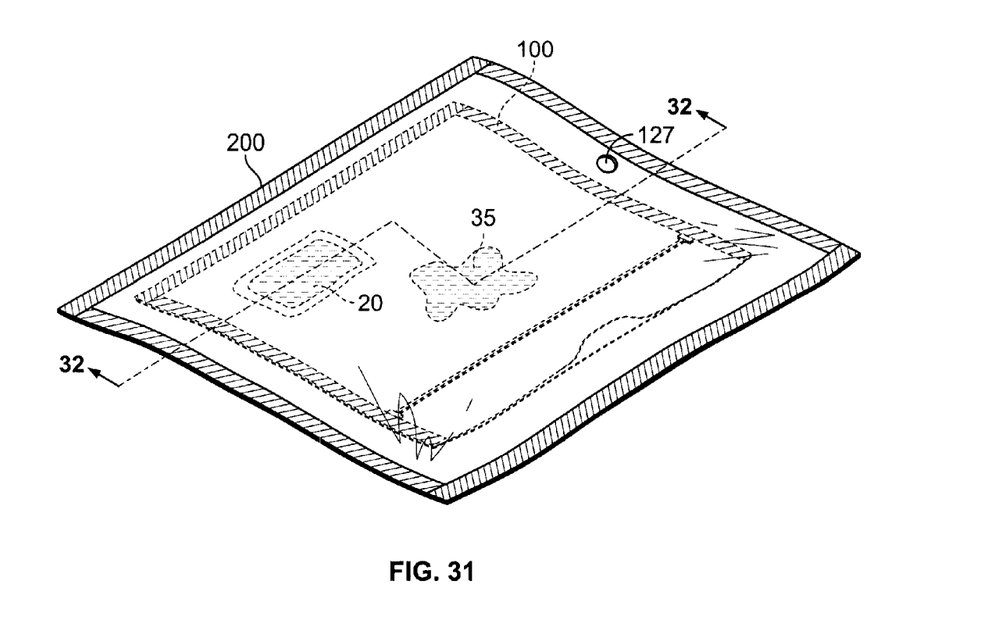
FIG. 31 is a perspective view of the packaging system for producing a foam-in bag with a plastic bag with a reclosable opening, a precursor packet, and a second precursor solution in the plastic bag according to another embodiment of the present disclosure.
Figure 32:
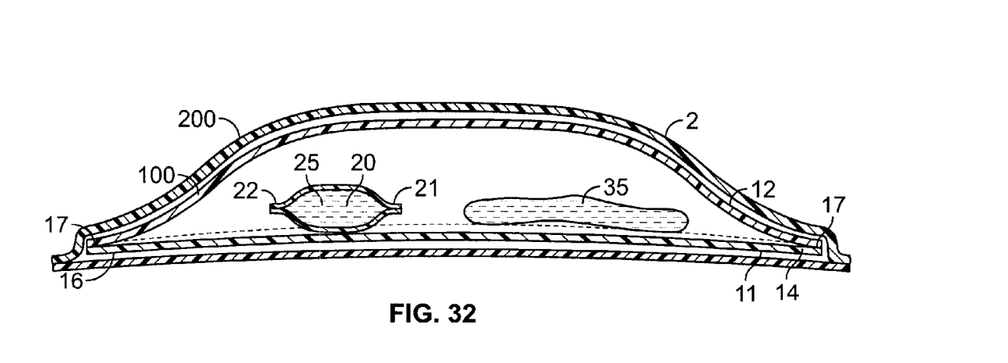
FIG. 32 is an elevation view of the plastic bag with a reclosable opening and secured precursor packets of FIG. 31 as viewed along line 32-32.

What is disclosed is a first precursor packet 20 having a first sealed pouch 21 and an encapsulated first precursor solution 25 as shown in FIG. 3. In an embodiment, the plastic bag 100 also includes a second precursor packet 30 having a second sealed pouch 31 and an encapsulated second precursor solution 35. In another embodiment as shown in FIGS. 31-32, the packaging system 1 includes only a first precursor packet 20, which has a first sealed pouch 21 and an encapsulated first precursor solution 25, and a second precursor solution 35 free from any second precursor packet 30 to be inserted in the plastic bag 100 before it is sealed. While small, flat packets 20, 30 are shown, what is contemplated is the use of any enclosed volume capable of holding a quantity of precursor solution 25, 35 and capable of modification to release the precursor solutions 25, 35 to mix and initiate a chemical reaction to create foaming.

Figure 4:
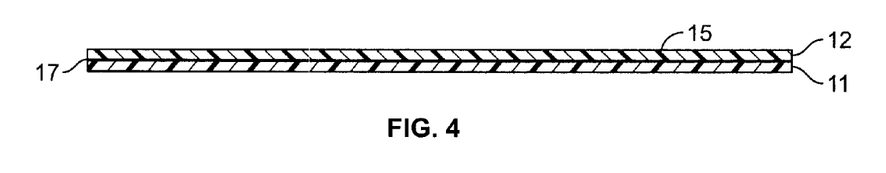
FIG. 4 is an elevation view of the plastic bag having a reclosable opening of FIG. 3 as viewed along line 4-4.
Figure 5:
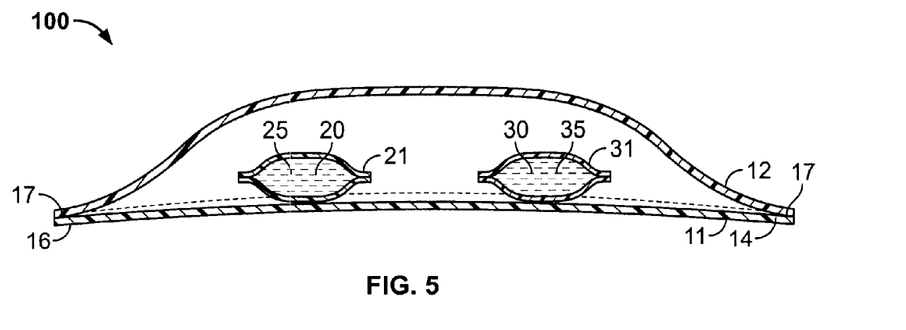
FIG. 5 is an elevation view of the plastic bag having a reclosable opening of FIG. 3 as viewed along line 5-5.
Figure 7:
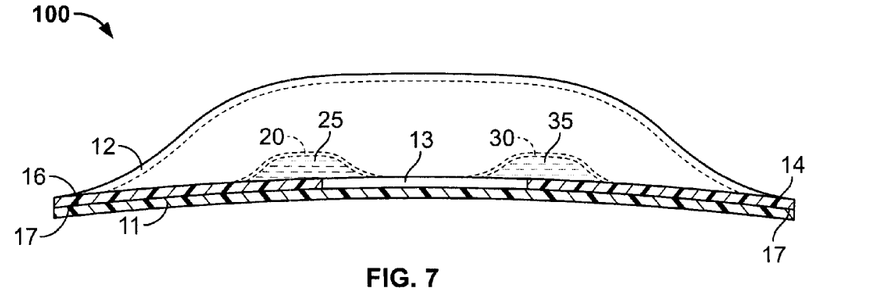
FIG. 7 is an elevation view of the plastic bag having a reclosable opening of FIG. 3 as viewed along line 7-7.
Figure 30:
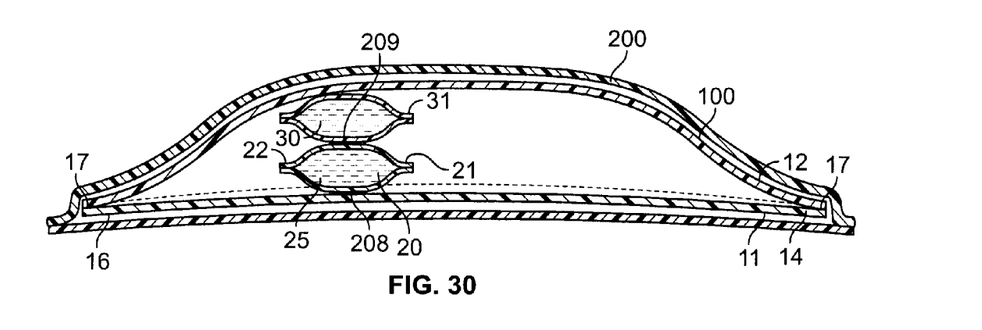
FIG. 30 is an elevation view of the plastic bag having a reclosable opening and secured precursor packets of FIG. 29 as viewed along line 30-30.

In an embodiment shown in FIG. 3, a plastic bag with a reclosable opening 100 includes an outer shell 15 and a release path 12 for the first and second precursor solutions 25, 35. A notch 13 on one layer of the plastic bag 100 illustrates both adjacent layers and shows one contemplated variability in bag geometry. The first and second sealed pouches 21, 31 forming the first and second precursor packets 20, 30 are held in the plastic bag 100 and the deformable outer bag 200 in the outer shell 2. As shown, the outer shell is made of a first layer 11, a second layer 12 attached at one end by a reclosable locking mechanism 10, and a plurality of seals 14, 15, 16 on the other sides. FIG. 4 illustrates how the first layer 111 and the second layer 12 may be sealed using a bonded region 17 at the seal 15. FIG. 5 illustrates how the first layer 11 and the second layer 12 are also include lateral bonded regions 17 at both sides of the deformable bag 200 at seals 14 and 16. FIG. 7 illustrates the same configuration but from another position on the plastic bag 100. The plastic bag 100 as shown has a reclosable opening 10, such as reclosable male/female lock lips, is encapsulated in the deformable outer bag 200 and the first and second precursor packets 20, 30 are disjoined. In yet another embodiment shown in FIGS. 29-30, the first and second precursor packets 20, 30 are individual pouches joined by an adhesive 209 at a junction surface between the two packets 20, 30. In another embodiment, the two packets 20, 30 united by adhesive 209 are further connected to the plastic bag 100 by a second adhesive 208. While FIG. 30 illustrates the packets 20, 30 stacked vertically, what is contemplated is the stacking of the packets 20, 30 in any configuration that allows a user of the packaging system 1 to apply pressure to both packets 20, 30 through the plastic bag 100 and the deformable outer bag 200 in a single operation. For example, if the packets 20, 30 are long, cylindrical tubes (not shown), such as sticks used for underwater diving lights, the packets 20, 30 may be attached in such way to facilitate the rupture of both sticks in a single operation by the user of the packaging system 1. Once again, while a single geometric configuration is shown, what is disclosed is the use of the described general principle in conjunction with the described technology as applied to any structure known and contemplated by one of ordinary skill in the art.

Functionally, the foam-in bag is produced as a result of an external pressure applied to the first and second packets 20, 30 through the plastic bag 100 and the deformable outer bag 200 and where the first and second precursor solutions 25, 35 are mixed. As the foam expands into place, it is released into the deformable outer bag 200 through a preferential release path. The packaging system 1 is designed to improve and facilitate the mixing of the precursor solutions 25, 35 in a tailored volume and further allow the foam to expand into a fixed and controlled volume defined by the deformable outer bag 200 using release paths. One of ordinary skill in the art recognizes that while two packets 20, 30 of generally similar geometry are shown, what is contemplated is the use of packets 20, 30 with different geometries, different surfaces, different sizes, and different volumes of precursor solutions 25, 35 based on the different types of foam to be created within the deformable outer bag 200.

Figure 8:
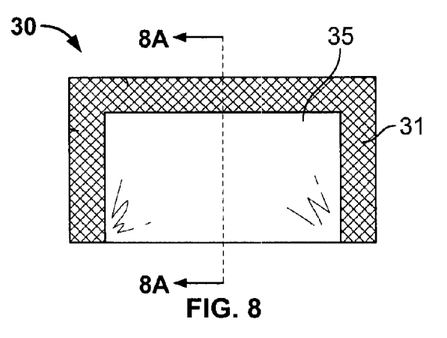
FIG. 8 is top view of a precursor packet with a top and lateral sides closed using a peelable seal and a bottom side closed by a fold in the plastic sheet according to an embodiment of the precursor packet of the present disclosure.
Figure 8A:
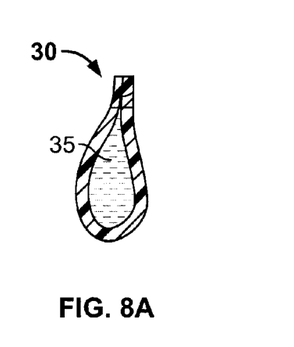
FIG. 8A is a side elevation view of the precursor packet of FIG. 8 viewed along line 8A-8A illustrating the precursor fluid.
Figure 9:
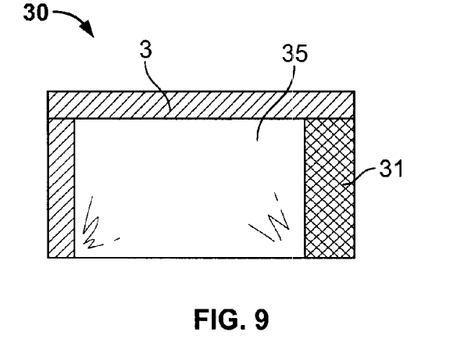
FIG. 9 is a top view of a precursor packet with a top and a lateral seal, a right lateral peelable seal, and a bottom side closed by a fold in the plastic sheet according to another embodiment of the precursor packet of the present disclosure.
Figure 11:
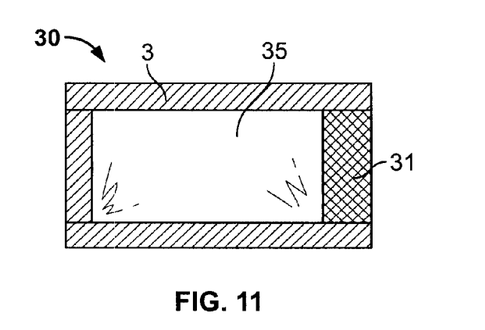
FIG. 11 is a top view of a precursor packet with a top, a bottom, and a right lateral peelable seal according to another embodiment of the precursor packet of the present disclosure.

In one embodiment, the first and second precursor packets 20, 30 are sealed using a peelable seal as defined hereabove. Packets may be closed partially or fully by peelable seals 31 or by permanent seals 3 as shown in a plurality of configurations in FIGS. 8-11. In FIG. 9, the first and second precursor packets 20, 30 are partially sealed using a first section of permanent seal 3 and a second section of peelable seal 31. In FIG. 10, the precursor solution 35 is encapsulated in the precursor packet 30 by a peelable seal 31 over the entire periphery of the precursor packet 30. In yet another embodiment shown in FIG. 8, the precursor solution 35 is encapsulated in the precursor package 30 by a peelable seal 31 over a first portion of the periphery of the precursor packet, a permanent seal 3 over a second portion of the periphery of the precursor packet, and not sealed but merely closed by a fold in the sealed pouch 30 as shown in FIG. 8A. In FIG. 11, the reclosable seal 31 is used to form a preferential release path; if pressure is applied to the sealed pouch 30, it is more probable that the reclosable seal 31 will open before the permanent seal portion 3. While FIG. 1 shows a configuration where the first and second precursor packets 20, 30 are of similar geometry and have the same configuration, what is contemplated is the use of two precursor packets of similar or dissimilar type based on user needs. For example, in a packaging system 1 where one of the precursor packets is small compared to a second precursor packet, a seal configuration as shown in FIG. 10 may be required to ensure that the first precursor solution is properly mixed with the second precursor solution.

In addition to using seal technology as a first control mechanism of the precursor solutions 25, 35, what is also shown in FIGS. 12-16 is the use of controlled release openings made in the plastic bag 100 to channel the expanding foam into the deformable outer bag 200 in preferential flow. Dynamic flow resulting from foam release enhances local mixing and makes sure that an optimal quantity of foam but not precursor solution is released from the plastic bag 100. In FIGS. 12-16, arrows are used to illustrate the preferential flow path of the foam along the release path. Once the precursor solutions 25, 35 mixes, the foam inside the plastic bag 100 slowly expands and eventually pulls apart the reclosable locking mechanism 10 because of the resulting pressure within the plastic bag 100.

Figure 6:
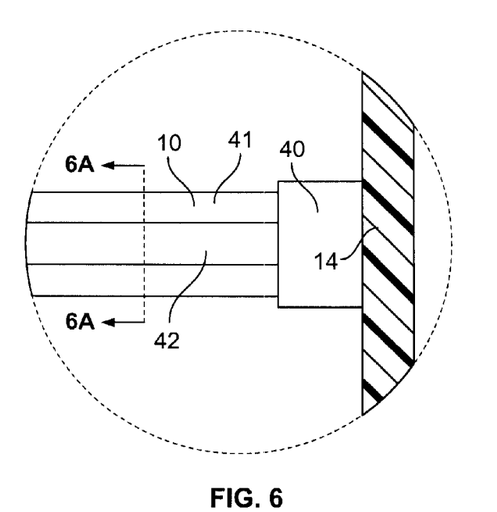
FIG. 6 is a detail view of the plastic bag having a reclosable opening of FIG. 3 as shown by the zone numbered 6 illustrating the side portion of the reclosable locking mechanism according to an embodiment of the present disclosure.
Figure 6A:
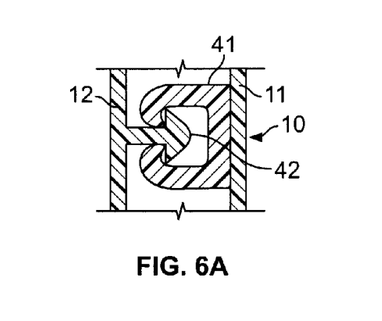
FIG. 6A is a detailed elevation view of the reclosable locking mechanism as shown in FIG. 6 as viewed along line 6A-6A.

FIGS. 6, 6A show in greater detail a possible embodiment of the reclosable locking mechanism 10 as generally known in the marketplace. The reclosable locking mechanism 10 includes a head 42 with retention lips at a distance from a first layer of the bag 12. The second layer of the bag 11 is equipped with a female lock 41 with an opening for receiving the head 42 and holding the lips within the female lock 41 as shown in FIG. 6A. FIG. 6 shows how the reclosable locking mechanism 10 may be welded in place 40 using a tack point. What is also contemplated is the use of a frangible seal or a peelable seal 31 instead of a female and male locking mechanism 10. In a preferred embodiment, the reclosable locking mechanism 10 is made of to adjacent locks in the form of parallel heads 42 that interlocks with parallel female locks 41 on the adjacent layer of the bag 11, 12.

Figure 12:
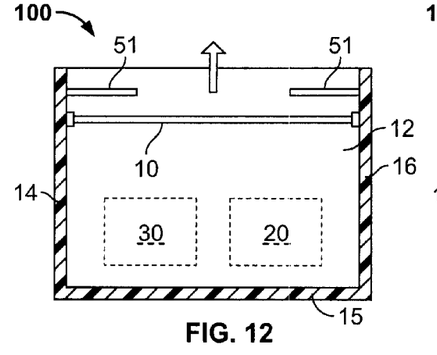
FIG. 12 is a top schematic representation of the plastic bag having a reclosable opening of FIG. 3 with two lateral sealed segments as foam guides according to an embodiment of the plastic bag of the present disclosure.
Figure 13:
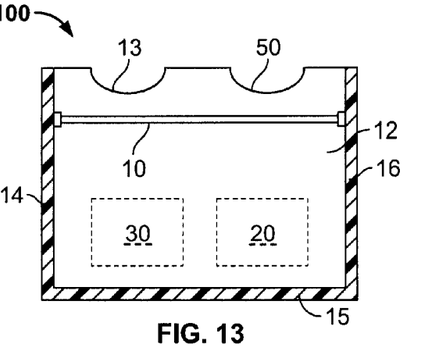
FIG. 13 is a top schematic representation of the plastic bag having a reclosable opening of FIG. 3 with two cut-out portions as foam guides according to another embodiment of the plastic bag of the present disclosure.
Figure 14:
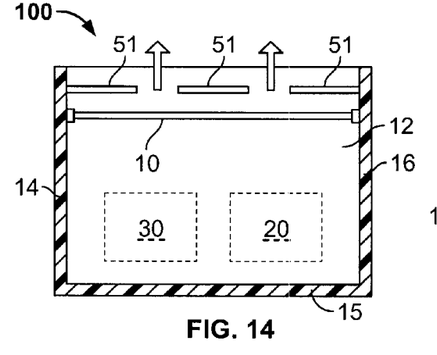
FIG. 14 is a top schematic representation of the plastic bag having a reclosable opening of FIG. 3 with two lateral sealed segments and one central sealed segment as foam guides according to another embodiment of the plastic bag of the present disclosure.
Figure 15:
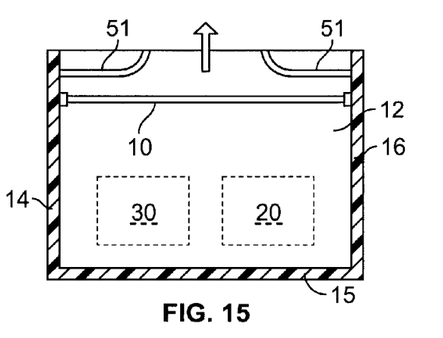
FIG. 15 is a top schematic representation of the plastic bag having a reclosable opening of FIG. 3 with two bent lateral seals as foam guides according to another embodiment of the plastic bag of the present disclosure.
Figure 15A:
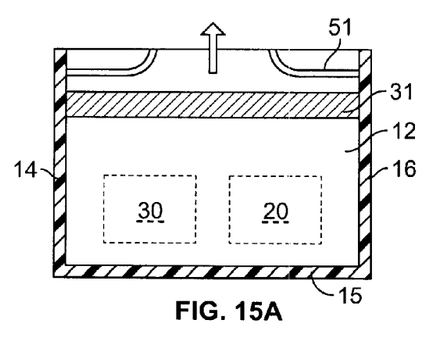
FIG. 15A is a top schematic representation of the plastic bag having a frangible opening with two bent lateral seals as foam guides according to another embodiment of the plastic bag of the present disclosure.
Figure 16:
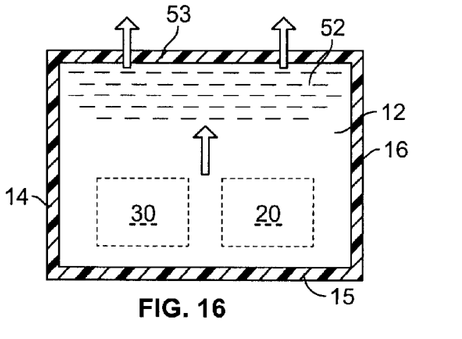
FIG. 16 is a top schematic representation of a plastic bag with small, perforated sections as foam guides according to another embodiment of the plastic bag of the present disclosure.

Absent any release path, the foam simply migrates to the deformable outer bag 200 through the entire opening created by the opening of the reclosable locking mechanism 10. FIG. 12 shows a configuration having two lateral sealed segments 51 functioning as foam guides, FIG. 13 shows a configuration having two cut-out portions functioning as foam guides, FIG. 14 shows a configuration having two lateral sealed segments and one central sealed segment functioning as foam guides, FIG. 15 shows a configuration having two bent lateral seals functioning as foam guides, FIG. 15A shows the above configuration with as a reclosable locking mechanism 10 a frangible 31, and FIG. 16 shows a configuration having small, perforated sections functioning as foam guides according to another embodiment of the plastic bag of the present disclosure. While five possible embodiments are shown, what is contemplated is the use of any foam guide configuration as would be obvious to one of ordinary skill in the art.

Figure 2:
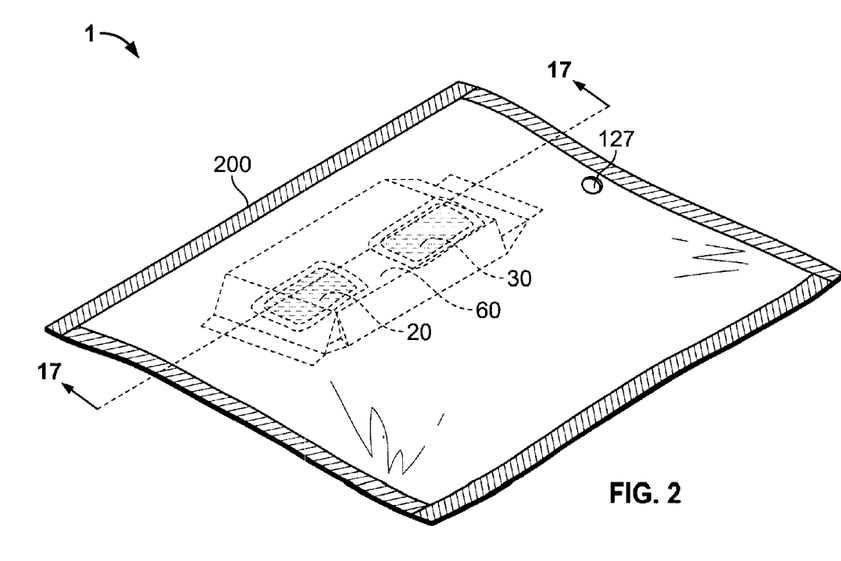
FIG. 2 is a perspective view of the packaging system for producing a foam-in bag with a paperboard box according to another embodiment of the present disclosure.
Figure 17:
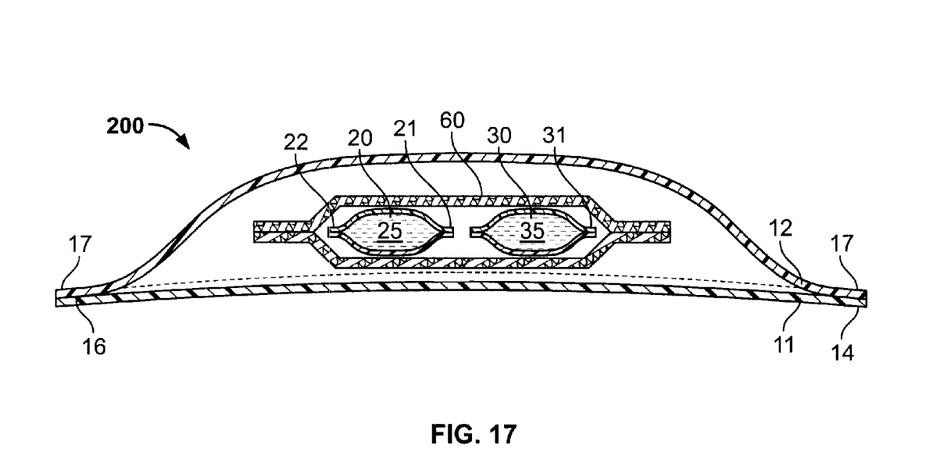
FIG. 17 is an elevation view of the packaging system for producing a foam-in bag with a paperboard box of FIG. 2 as viewed along line 17-17 according to an embodiment of the present disclosure.
Figure 18:
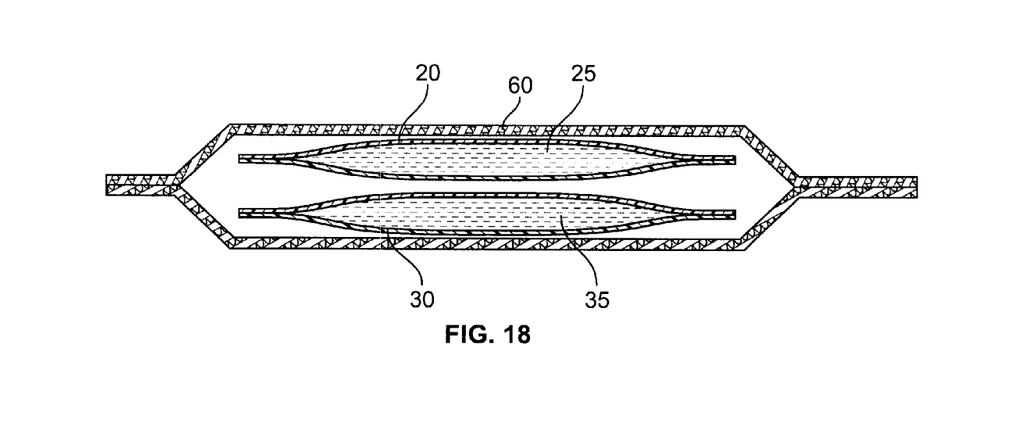
FIG. 18 is a front schematic representation of the paperboard box as shown in FIG. 2 where the two precursor packets are positioned vertically according to an embodiment of the present disclosure.
Figure 19:
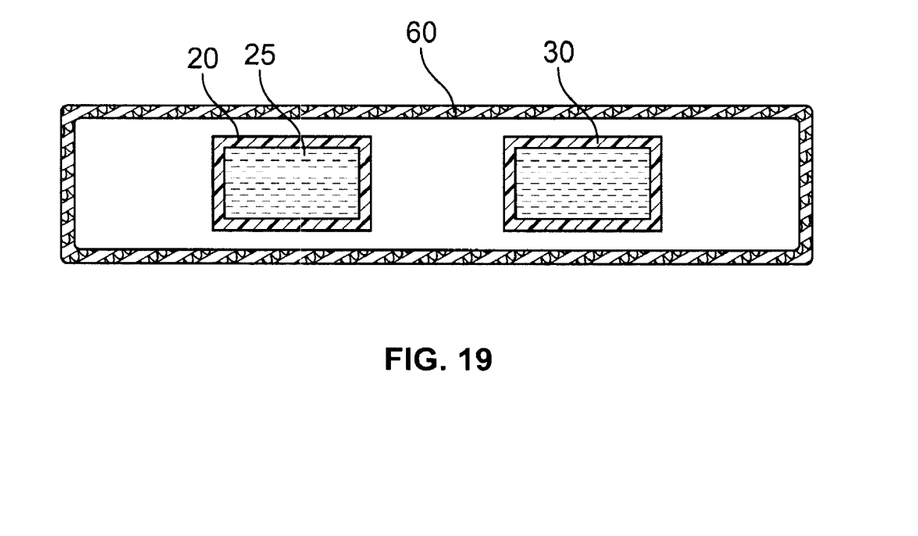
FIG. 19 is a top schematic view of the paperboard box as shown in FIG. 2 where the two precursor packets are positioned horizontally according to another embodiment of the present disclosure.
Figure 20:
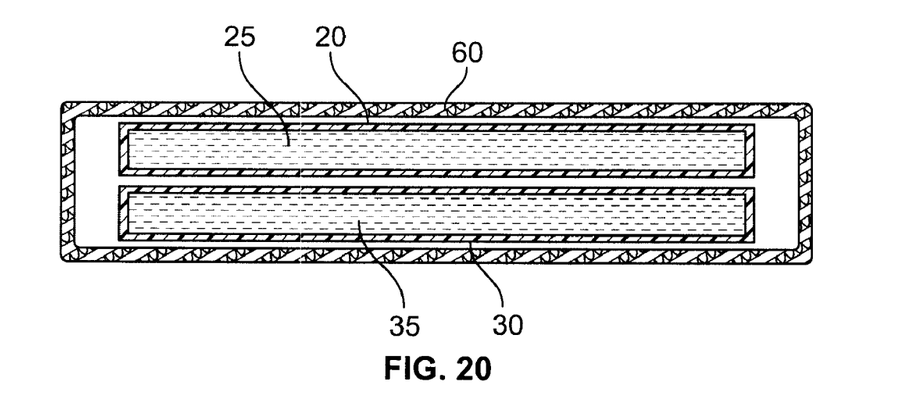
FIG. 20 is a top schematic view of the paperboard box as shown in FIG. 2 where the two precursor packets are positioned horizontally and side-by-side according to another embodiment of the present disclosure.

In one alternate embodiment shown as FIGS. 2 and 17, a paperboard box 60 shown having folded ends is used in lieu of a plastic bag 100. The paperboard box 60 has several unique advantages, the first being its capacity to dissolve during the process of foam making when in contact with the precursor solutions 25, 35. The paperboard box 60 also has inherent strength that allows for a better protection of the first and second precursor packets 20, 30. FIG. 18 shows a configuration where precursors packets 20, 30 are positioned vertically in the paperboard box 60. FIG. 20 shows a configuration where the two precursor packets are positioned horizontally and side-by-side in the paperboard box 60. Another advantage of the use of paperboard boxes over a plastic bag 100 includes the capacity to stack the boxes during manufacture for better manipulation and accountability.

In the paperboard box configuration shown in FIG. 2, the packaging system 1 for producing a foam-in bag includes a first precursor packet 20, which has a first sealed pouch 21 and an encapsulated first precursor solution 25, and a second precursor packet 30, which has a second sealed pouch 31 and an encapsulated second precursor solution 35. The paperboard box 60 has an outer shell made of paperboard in one embodiment (as shown) and a release path for the first and second precursor solutions 25, 35. The first and second sealed pouches 21, 31 are encapsulated in the paperboard box 60, and a deformable outer bag 200 having an outer shell 2, a gas release valve 127, and the paperboard box 60 is held in the bag 200. In addition, the first and second precursor packets 20, 30 are disjoined in the paperboard box 60, and an external pressure is applied to the first and second packets 20, 30 through the paperboard box 60 and the deformable outer bag 200, and the first and second precursor solutions 25, 35 are mixed and released into the deformable outer bag 200 through the release path for creation of a foam encased within the deformable outer bag by reaction of the mixed precursor solutions 25, 35.

Figure 21:
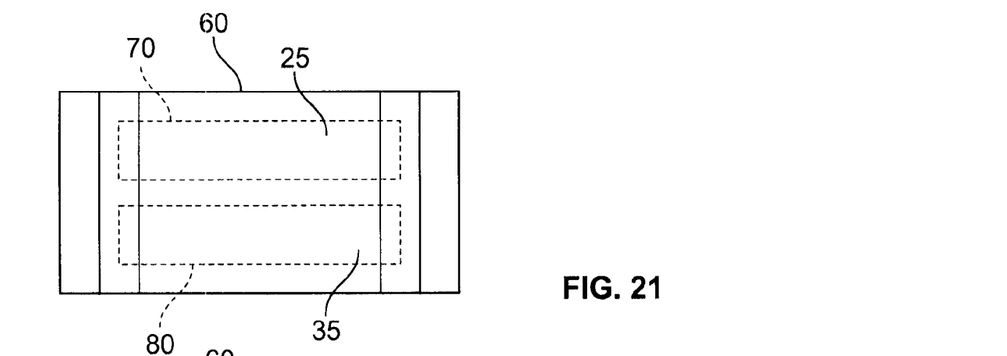
FIG. 21 is a top view of the paperboard box as shown in FIG. 2 with score lines forming two parallel rectangles on the upper surface of the box according to an embodiment of the paperboard box of the present disclosure.
Figure 22:
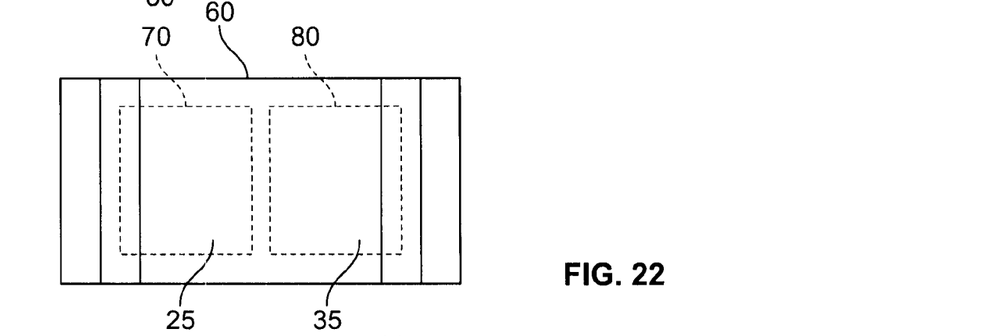
FIG. 22 is a top view of the paperboard box as shown in FIG. 2 with score lines forming two side-by-side rectangles on the upper surface of the box according to another embodiment of the paperboard box of the present disclosure.
Figure 23:
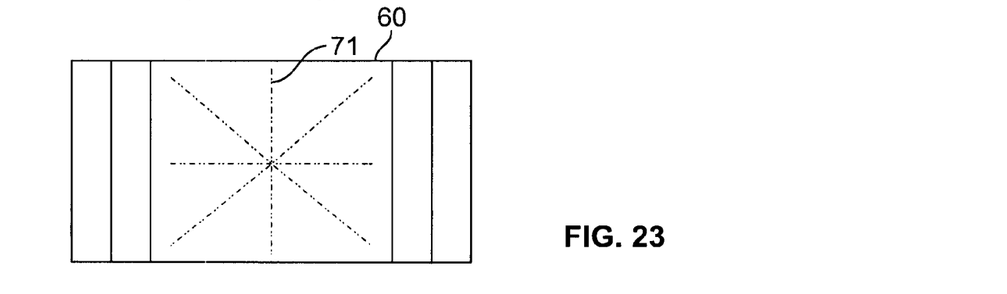
FIG. 23 is a top view of the paperboard box as shown in FIG. 2 with star-shaped score lines on the upper surface of the box according to another embodiment of the paperboard box of the present disclosure.
Figure 24:
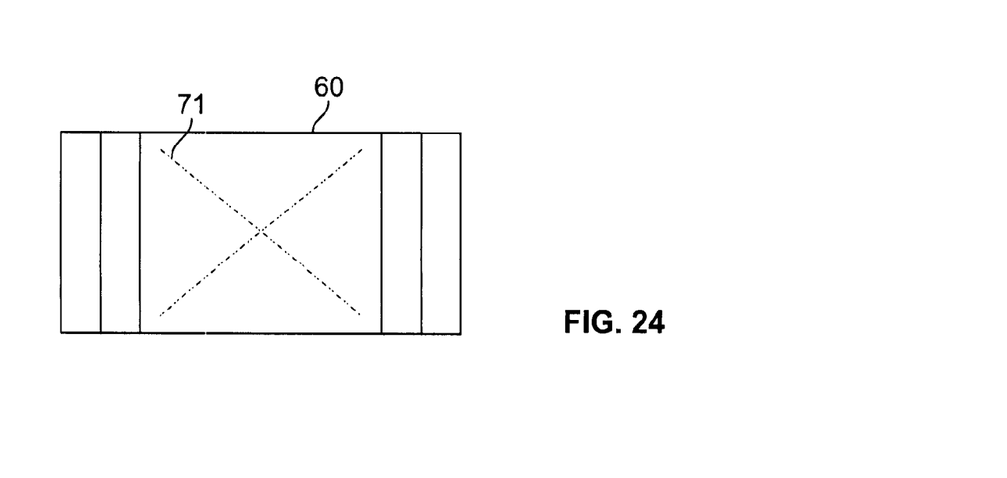
FIG. 24 is a top view of the paperboard box as shown in FIG. 2 with X-shaped score lines on the upper surface of the box according to another embodiment of the paperboard box of the present disclosure.
Figure 25:
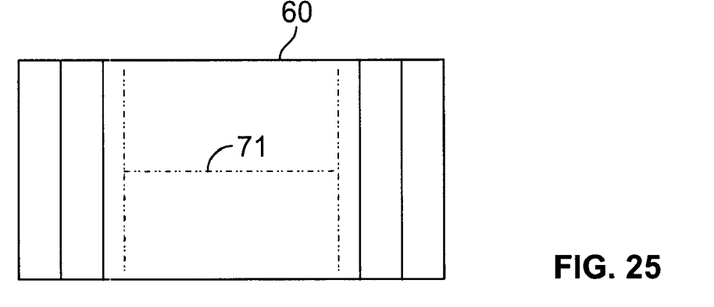
FIG. 25 is a top view of the paperboard box as shown in FIG. 2 with an I-shaped score line on the upper surface of the box according to another embodiment of the paperboard box of the present disclosure.
Figure 26:
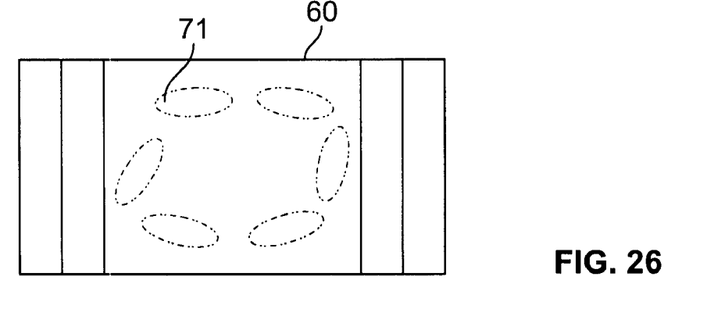
FIG. 26 is a top view of the paperboard box as shown in FIG. 2 with oval score lines on the upper surface of the box according to another embodiment of the paperboard box of the present disclosure.
Figure 27:
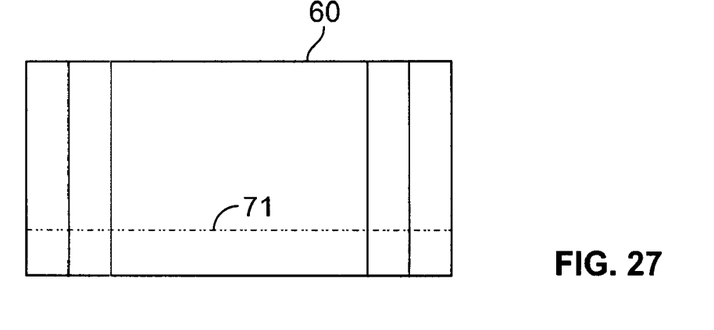
FIG. 27 is a top view of the paperboard box as shown in FIG. 2 with an off-set longitudinal score line on the upper surface of the box according to another embodiment of the paperboard box of the present disclosure.
Figure 28:
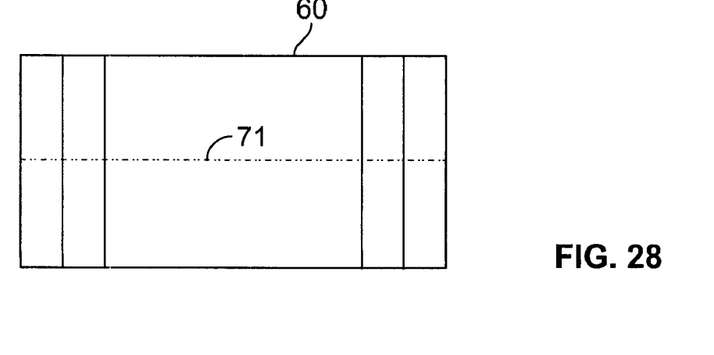
FIG. 28 is a top view of the paperboard box as shown in FIG. 2 with a central longitudinal score line on the upper surface of the box according to another embodiment of the paperboard box of the present disclosure.
Figure 29:
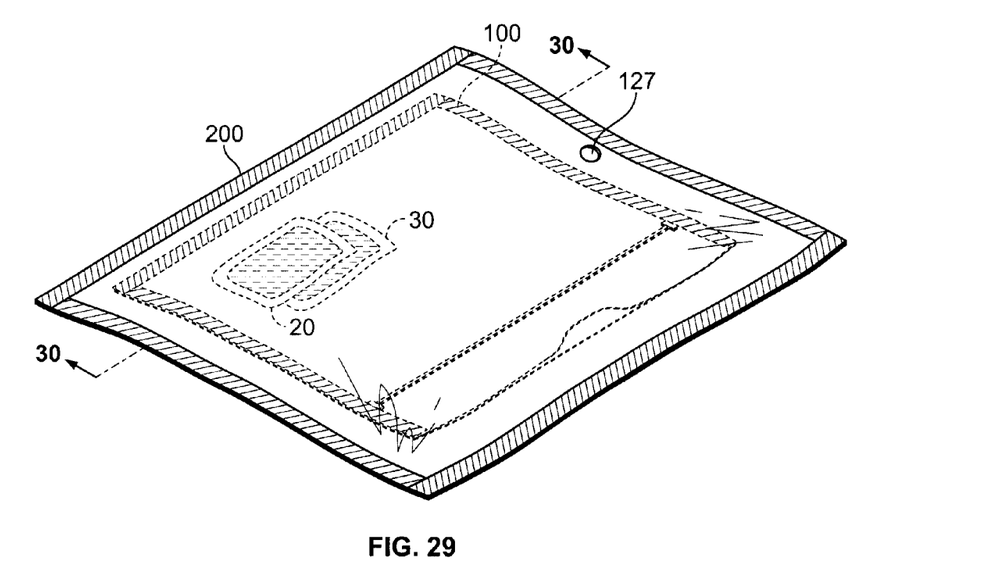
FIG. 29 is a perspective view of the packaging system for producing a foam-in bag having a plastic bag with a reclosable opening and secured precursor packets according to another embodiment of the present disclosure.

Much like possible release paths for the plastic bag 100 illustrated in FIGS. 12-16, FIGS. 21-28 illustrate possible configurations of release paths for the paperboard box 60. In one contemplated embodiment (not shown), a sealed end of the paperboard box is used to form the release path. What is contemplated is the use of score lines 70, 71 to create a local weakness in the paperboard box to create a preferential release path. In one embodiment, the local weakness score line 71 is placed at the seam or edge of the paperboard box 60 to enhance natural weakness created during bending operations when the paperboard box 60 is formed. FIG. 21 contemplates the use of score lines forming two parallel rectangles 70 on the upper surface of the paperboard box 60, FIG. 22 contemplates the use of score lines forming two side-by-side rectangles 70 on the upper surface of the paperboard box 60, FIG. 23 contemplates the use of star-shaped score lines 71 on the upper surface of the paperboard box 60, FIG. 24 contemplates the use of X-shaped score lines 70 on the upper surface of the paperboard box 60, FIG. 25 contemplates the use of an I-shaped score line 71 on the upper surface of the paperboard box 60, FIG. 26 contemplates the use of over score lines 71 on the upper surface of the paperboard box 60, FIG. 27 contemplates the use of an off-set longitudinal score line 71 on the upper surface of the paperboard box 60, and FIG. 28 contemplates the use of a central longitudinal score line 71 on the upper surface of the paperboard box 60. While a plurality of possible preferential release paths 70, 71 in the form of score lines is shown, what is contemplated is the use of any weakening structure, fold, variable thickness, or variation in material to create a preferential release path in the paperboard box 60.

Figure 33:
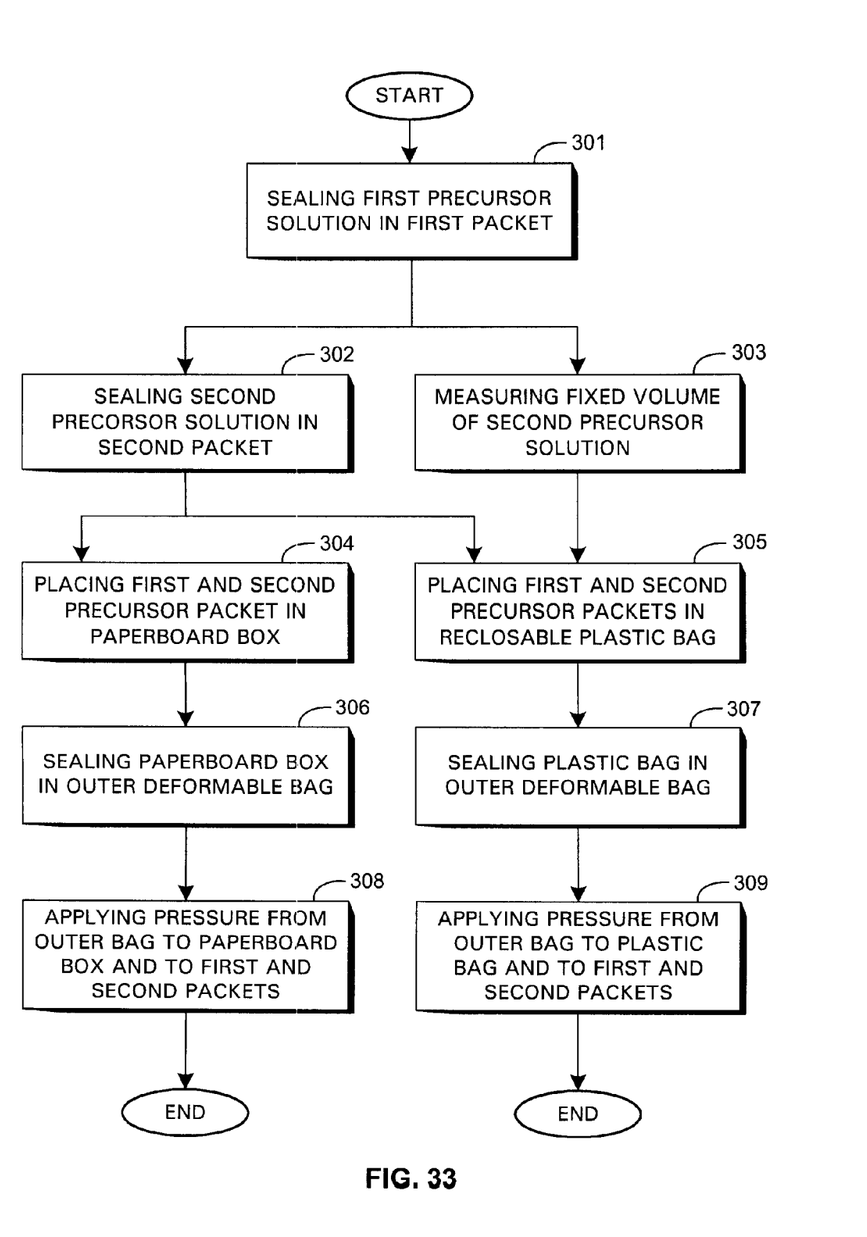
FIG. 33 is a diagrammatic representation of a method of mixing foam precursors in a foam-in-bag packaging system according to an embodiment of the present disclosure.

Finally, what is also contemplated and shown diagrammatically in FIG. 33 is a method of mixing foam precursors in a foam-in-bag packaging system 1 as described hereabove according to an embodiment of the present disclosure. The method of mixing foam precursors 25, 35 in a foam-in-bag system 1 includes the steps of sealing 301 a first precursor solution 25 in a first precursor packet 20, sealing a second precursor solution 35 in a second precursor packet 30 disjoined from the first precursor packet 20, and in an alternate embodiment measuring 303 a fixed volume of second precursor solution 35 and sealing 305 the first packet 20 and the second precursor solution 35 in the plastic bag 100. In a subsequent step, the plastic bag 100 is sealed 307 inside of a deformable outer bag 200, and finally, applying pressure 309 from the external surface of the deformable outer bag 200 to the precursor solution causes mixture and release of a first and a second precursor solutions 25, 35 located in the first and second precursor packets 20, 30, or located in the first precursor packet 20 and the plastic bag 100, respectively, to the deformable outer bag 200 through a release path. In one alternate embodiment, the first and second precursor packets 20, 30, are placed 304 in the paperboard box 60 before sealing 306 the paperboard box and applying pressure 308 from the outer bag 200 to the paperboard box 60 to rupture the precursor packets 20, 30 and mix the precursor solutions 25, 35.

It is understood that the preceding is merely a detailed description of some examples and embodiments of the present invention and that numerous changes to the disclosed embodiments can be made in accordance with the disclosure without departing from the spirit or scope of the invention. The preceding description, therefore, is not meant to limit the scope of the invention but to provide sufficient disclosure to one of ordinary skill in the art to practice the invention without undue burden.

What is claimed is:

1. A packaging system for producing a foam-in bag, comprising:
a first precursor packet having a first sealed pouch and an encapsulated first precursor solution;
a second precursor packet having a second sealed pouch and an encapsulated second precursor solution;
a plastic bag having an outer shell including a releasable seal defining a primary opening for release of a mixture of the first and second precursor solutions and a foam guide formed in the outer shell to define a secondary opening for release of the, wherein the first and second precursor packets are encapsulated in the plastic bag such that the primary opening having a primary size is disposed between the first and second precursor packets and the secondary opening having a secondary size, and the primary size of the primary opening is greater than the secondary size of the secondary opening; and
a deformable outer bag having an outer shell and a gas release valve, wherein the plastic bag is encapsulated in the deformable outer bag,
wherein the first and second precursor packets are joined by a first adhesive at a junction surface between the first and second precursor packets and where one of the first and second precursor packets is further connected to the plastic bag by a second adhesive, and where an external pressure is applied to the first and second packets through the plastic bag and the deformable outer bag, and where the first and second precursor solutions are mixed and the mixture is released into the deformable outer bag, first through the primary opening and second through the secondary opening, for creation of a foam encased within the deformable outer bag by reaction of the mixture.

2. The packaging system for producing a foam-in bag of claim 1, wherein the first and second precursor packets are sealed using a peelable seal.

3. The packaging system for producing a foam-in bag of claim 1, wherein the first and second precursor packets are sealed partially using a first section of permanent seal and a second section of peelable seal.

4. The packaging system for producing a foam-in bag of claim 3, wherein each of the first and second precursor solution is encapsulated in the respective first and second precursor packet by a peelable seal over a periphery of the respective first and second precursor packet.

5. The packaging system for producing a foam-in bag of claim 3, wherein each of the first and second precursor solution is encapsulated in the respective first and second precursor packet by a peelable seal over a first portion of the periphery of the respective first and second precursor packet and by a permanent seal over a second portion of the periphery of the respective first and second precursor packet.

6. The packaging system for producing a foam-in bag of claim 5, wherein a third portion of the periphery of the respective first and second precursor packet is not sealed but is closed by a fold in the sealed pouch.

7. The packaging system for producing a foam-in bag of claim 1, wherein the foam guide is in a shape selected from the group consisting of a side-sealed segment in the plastic bag, a cut-out portion, a seal with two unsealed portions, bent lateral seals, a folded side with cut-out portions, and small perforated sections.

* * * * *